March 29, 1966  P. M. J. LALLEMANT  3,243,019
FRICTION DISC DEVICES FOR DISC BRAKES
Filed Feb. 4, 1965  2 Sheets-Sheet 1
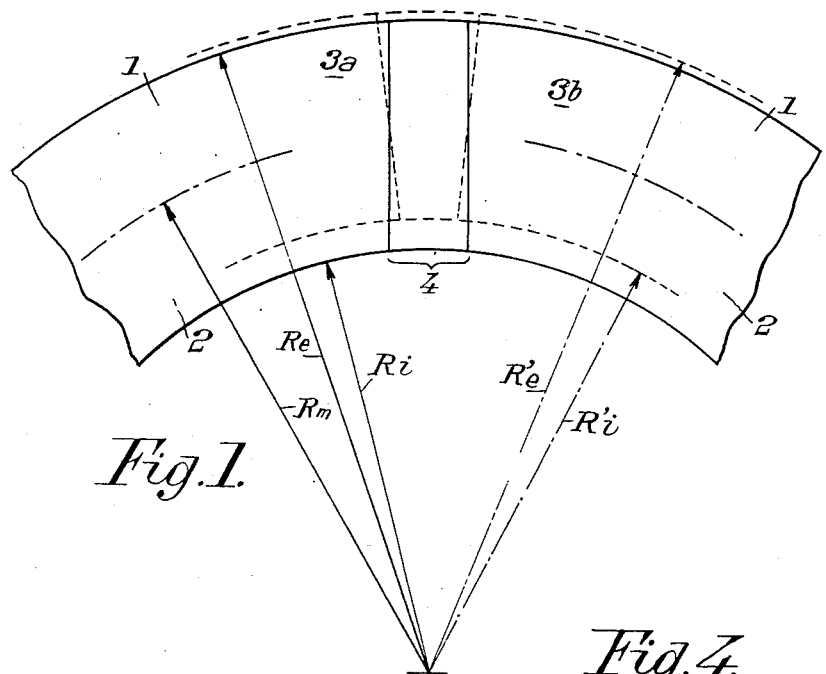
*Fig.1.*
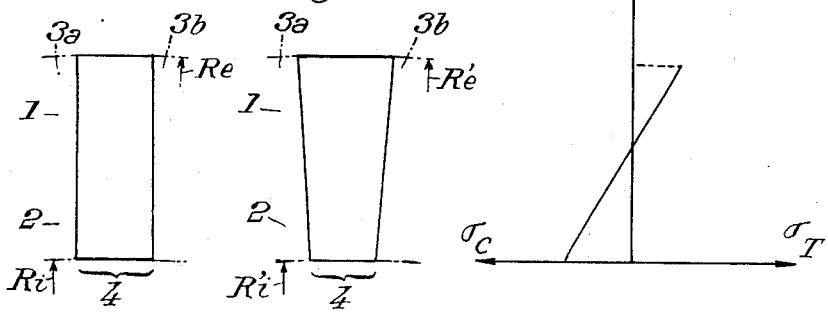
*Fig.2.*  *Fig.3.*  *Fig.4.*
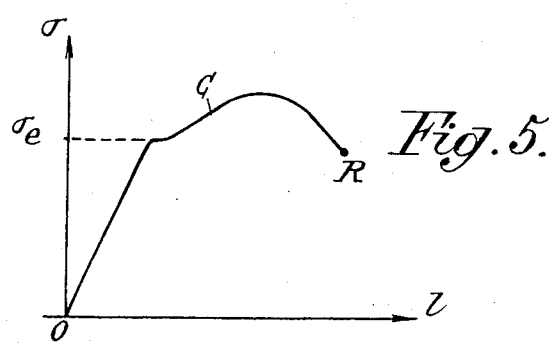
*Fig.5.*

March 29, 1966 P. M. J. LALLEMANT 3,243,019
FRICTION DISC DEVICES FOR DISC BRAKES
Filed Feb. 4, 1965 2 Sheets-Sheet 2
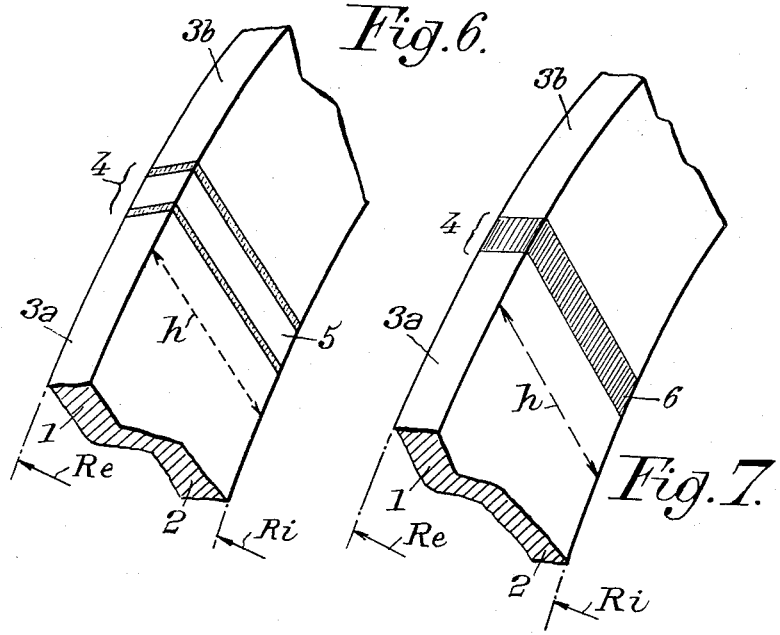
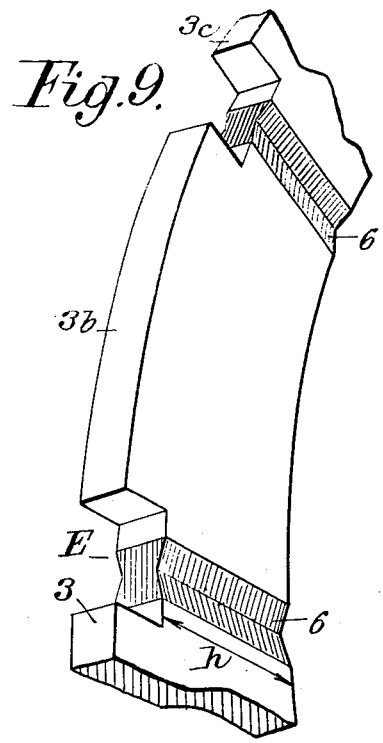
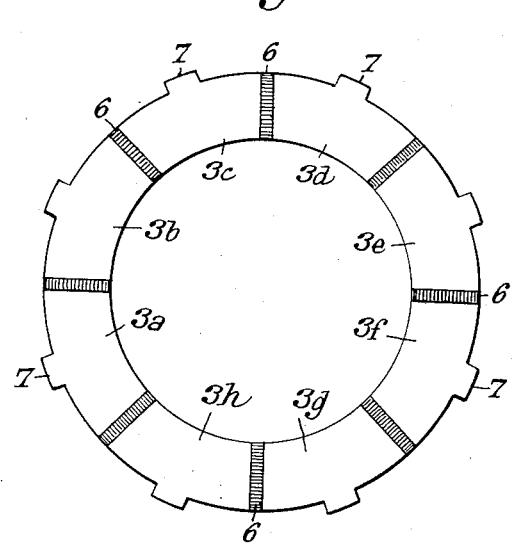

United States Patent Office 3,243,019
Patented Mar. 29, 1966

3,243,019
FRICTION DISC DEVICES FOR DISC BRAKES
Pierre Martin Joseph Lallemant, Port-Marly, France, assignor to Societe Hispano-Suiza Lallemant, Bois-Colombes (Seine), France, a society of France
Filed Feb. 4, 1965, Ser. No. 430,299
Claims priority, application France, Dec. 6, 1961, 881,136
2 Claims. (Cl. 188—218)

The present application is a continuation-in-part of my prior U.S. patent application Serial No. 239,577 filed November 23, 1962, for "Improvements in Friction Disc Devices, in Particular in Disc Brakes."

The present invention relates in a general manner to devices comprising at least one friction disc, i.e. at least one disc, either fixed or movable, intended to cooperate frictionally with at least one element with which it is brought into contact through at least one of its faces and with respect to which it has a relative speed of rotation. The invention is more especially, but not exclusively, concerned with disc brakes, in particular for earth or aerial vehicles.

It is known that, during the operation of friction disc devices, temperature gradients are produced in the mass of the discs.

These temperature gradients produce deformations which, in view of the hyperstatic character of the disc, generate detrimental mechanical stresses which may reach critical values, involving warping phenomenons in some areas of the disc.

It has already been proposed, in order to obviate the drawbacks due to these warping phenomenons, to include in these devices at least one friction disc of annular shape and comprising two distinct segments made of the same material, these two segments being generally connected together either through hinged assembly means mounted on said segments with some circumferential play or through resilient assembly means.

Such a solution destroyed the monobloc character of the disc and therefore impaired its mechanical behaviour in some circumstances.

The essential characteristic of the present invention is to provide, between the opposite ends of two successive segments of the disc, rigid assembly means each rigidly fixed to the respective ends of two successive segments, said rigid assembly means being made of a material the mechanical properties of which are such that the deformations produced by the temperature gradients that are produced when the device is in operation in every segment are absorbed, at least mostly, by the material of which said rigid assembly means are made.

Thus, the mechanical stresses created by the residual deformations that may still remain in every segment are substantially lower than the critical values involving warping phenomenons.

This construction, while preserving the monobloc character which is advantageous from the mechanical point of view, eliminates warping phenomenons.

According to a first embodiment of the invention, said rigid assembly means consists of a metallic junction piece welded to the respective ends of the segments to be connected together and extending approximately from the inner radius of the disc to its outer radius, the material of which said junction piece is made having, in all conditions of normal operation, a modulus of elasticity lower than that constituting the segments and/or an elastic limit lower than that of said material.

According to another embodiment of the invention the junction piece may consist of a weld extending between the respective ends of the segments to be connected together, this weld extending approximately from the inner radius to the outer radius of the disc, the mechanical properties of the weld being such that its modulus of elasticity and/or its elastic limit are lower than the modulus of elasticity and the elastic limit of the material constituting the segment and this for all normal conditions of operations of the friction disc.

Preferred embodiments of the present invention will be hereinafter described with reference to the appended drawings, given merely by way of example, and in which:

FIG. 1 is a partial elevation view of a friction disc made according to the invention, this disc being shown in solid lines in the position it occupies at ordinary temperature and in dotted lines in the position it occupies during operation;

FIG. 2 is an elevational view of a junction piece constituting the rigid assembly means provided between the segments of the disc, said junction piece being shown such that it is at ordinary temperature;

FIG. 3 shows the same junction piece such that it is during operation of the friction disc device;

FIG. 4 is a diagram showing the evolution of the mechanical stresses in the junction piece;

FIG. 5 is a diagram intended to facilitate the understanding of the invention;

FIG. 6 is a perspective view of a portion of a friction disc for an aircraft brake, made according to a first embodiment of the invention;

FIG. 7 is a similar view of another embodiment of the invention;

FIG. 8 is an elevational view of a friction disc for an aircraft brake, corresponding to the embodiment of FIG. 7;

FIG. 9 is a perspective view of a portion of a friction disc for an aircraft brake made according to still another embodiment of the invention.

In the following description, the invention will be supposed to be applied to the construction of a friction disc brake, especially for use on an aircraft.

It will be supposed, by way of example, that the invention is applied to a friction disc the opposed faces of which are adapted to cooperate with friction linings carried for instance by two stationary discs located on either side respectively of the rotating friction disc and adapted to be moved into contact therewith.

It has been found that, during operation, temperature gradients take place in the disc, the intensity and the direction of said gradients depending upon several factors among which may be cited the nature of the means for actuating the elements cooperating with the disc and the number and shape of these elements.

However, there is generally, as it will be hereinafter supposed, a radial gradient which corresponds to important temperature differences between the area 1 of the disc, located between the mean radius $R_m$ thereof and its external radius $R_e$ and the area 2 thereof, located between said mean radius $R_m$ and the inner radius $R_i$ (FIG. 1).

Area 2 is, as a rule, brought to temperatures much higher than those existing in area 1.

Of course these temperature differences between area 1 and area 2 produce deformations which may reach critical values involving warping of the disc.

The essential purpose of the invention is to obviate this drawback without reducing the rigidity of the disc or destroying the monobloc character thereof.

According to this feature, illustrated by FIG. 1, I provide, between the respective ends of the segments of the disc, for instance segments 3a and 3b, rigid assembly means rigidly fixed to said ends of segments 3a and 3b, said rigid assembly means 4 consisting of a material the mechanical properties of which are such that the deformations due to the radial temperature gradient occurring during operation are absorbed, at least partly, by the material of said assembly means 4.

Thus, while preserving a monobloc character which is advantageous from the mechanical point of view, the disc does not risk warping.

As shown by FIG. 1, when the disc is at ordinary temperature, it occupies the position shown in solid lines.

Its inner diameter is equal to $R_i$ and its outer diameter to $R_e$. The opposite ends of segments 3a and 3b that face each other are preferably parallel to each other and disposed perpendicularly to the edges of the disc.

When area 2 is brought to a temperature substantially greater than that of area 1, the disc comes to occupy the position shown in dotted lines, its inner diameter having a value $R'_i$ substantially greater than $R_i$ and its outer diameter a value $R'_e$ greater than $R_e$. The respective ends of segments 3a and 3b that face each other are no longer parallel.

In area 2 at relatively higher temperature these ends of 3a and 3b are nearer to each other than they were at rest (ordinary temperature).

On the contrary, in area 1, where the temperature is lower than in area 2, said ends are at a greater distance from each other than they were at rest.

In FIG. 2, I have shown the rigid assembly means 4 at ordinary temperature, whereas FIG. 3 shows the same rigid assembly means 4 in the conditions of operation of the disc.

It will be understood that, as shown by FIG. 4, where the stresses are shown in abscissas and the heights $h$ of the assembly means 4 in ordinates, the portion of the assembly means 4 corresponding to area 1 of segments 3a and 3b is subjected to pulling stresses, whereas the portion of the assembly means 4 located in area 2 is subjected to compression stresses.

Finally, it should be pointed out that after a period of operation of such a disc, the phenomenons described concerning the passage of a disc made as above stated from ordinary temperature to the temperatures reached during operation are reversible and that, after every period of operation, the disc comes back to a shape identical to that shown in solid lines in FIG. 1.

In order to avoid any misunderstanding it seems necessary to explain what is meant by "modulus of elasticity" and "elastic limit."

In FIG. 5, I have plotted in abscissas the relative elongations $$l = \frac{\Delta L}{L}$$

of a test piece of length L of any metallic material subjected to forces N, perpendicular to the cross section S of said test piece. In the same figure, I have plotted in ordinates the mechanical stresses $$\sigma = \frac{N}{S}$$

supported by the test piece under the effect of a force N.

In these conditions, curve C represents the variations of the relative elongations $l$ of the test piece as a function of the mechanical stresses $\sigma$. It is found that for practically all metallic materials, this curve C includes, starting from the origin (FIG. 5), a rectilinear portion, then a horizontal portion, an upward curvilinear portion and finally a downward curvilinear portion ending at point R where the test piece breaks.

The modulus of elasticity is the gradient of the upward rectilinear portion of curve C. In other words, $$E = \frac{\sigma}{l}$$

As for the elastic limit $\sigma_e$, it is the value of the mechanical stress $\sigma$ corresponding to the horizontal straight line portion of curve C.

I will now examine by way of example two embodiments of the invention illustrated by FIGS. 6 and 7, respectively.

According to the first of these embodiments (FIG. 6), the rigid assembly means 4 which connect together two successive segments of the disc such for instance as 3a and 3b, consists of a metallic junction piece 5 welded to said segments 3a and 3b.

The height $h$ of this junction piece 5 is such that said piece 5 extends approximately from the inner circumference of radius $R_i$, of the disc to its outer circumference of radius $R_e$.

As for the material of which junction piece 5 is made, it is chosen to have, in all normal operation conditions, a modulus of elasticity E lower than that of the material of segments 3a and 3b and/or an elastic limit $\sigma_e$ lower than that of said material.

According to the second of these embodiments (FIG. 7), the rigid assembly means 4 between segments 3a and 3b consist of a weld piece 6 between segments 3a and 3b.

The height $h$ of this weld is approximately the difference between the outer radius $R_e$ and the inner radius $R_i$.

The mechanical properties of the weld are such that its modulus of elasticity E and/or its elastic limit $\sigma_e$ are lower than the modulus of elasticity and the elastic limit, respectively, of the material of segments 3a and 3b, and this in all normal conditions of operation of the disc.

It should be pointed out that the materials used for constituting rigid assembly means 4 are suitable both for making a junction piece 5 according to the embodiment of FIG. 6 or a junction piece 6 according to the embodiment of FIG. 7. The following examples concerning the materials may therefore apply either to the embodiment of FIG. 6 or to that of FIG. 7.

Concerning the materials for making segments 3a and 3b I may advantageously make use of ferritic or martensitic steels, such for instance as:

The steel known under the designation "25 CD 4S," which contains from 0.21 to 0.28% of carbon, from 0.8 to 1.2% of chromium, from 0.15 to 0.30% of molybdenum, from 0.4 to 0.8% of manganese and 0.25% of silicium;

Or the steel known under the designation of "15 CDV 6," which contains from 0.12 to 0.18% of carbon, from 1.25 to 1.50% of chromium, from 0.8 to 1% of molybdenum, from 0.8 to 1.1% of manganese and from 0.2 to 0.3% of vanadium.

As for the material of the rigid assemby 4 (junction pieces 5 or 6) it is advantageous to use austenitic steels, nickel refractory alloys, cobalt refractory alloys or iron refractory alloys.

Among the austenitic steels I may choose: either that known under the designation "A 286" and which contains 25% of nickel, 15% of chromium, 0.05% of carbon and traces of vanadium, molybdenum, and titanium;

Or that known under the designation "304" and which contains from 17% to 20% of chromium, from 9 to 13% of nickel and traces of titanium.

Among the nickel refractory alloys, I may choose:

Either that known under the designation "Hastelloy X" which consists of from 41.35 to 51.75 percent of nickel, from 17 to 20 percent of iron, from 0.2 to 1 percent of wolfram, from 8 to 10 percent of molybdenum, from 0.5 to 2.5 percent of cobalt, from 20.5 to 23 percent of chromium, at most 1 percent of silicon, at most 1 percent of manganese and from 0.05 to 0.15 percent of carbon. In particular I have used such a mixture containing 21% of chromium, 17% of iron and 9% of molybdenum, Or that known under the designation "Nimonic 80/20 which contains 20% of chromium.

Among the cobalt refractory alloys, I may choose that known under the designation "HS 25" which contains 20% of chromium, 15% of tungsten and 10% of nickel.

Along the iron refractory alloys, I may choose that known under the designation "N 155," which contains 20% of cobalt, 20% of chromium and 20% of nickel.

Concerning the number of segments, such as 3a and 3b, of the disc, it is greater than three. As for the circumference dimensions of rigid assembly means 4, their total is substantially lower than that of said segments.

By way of example, I have shown in FIG. 8 a friction disc according to the present invention.

The inner radius $R_i$ of this disc is about 90 mm. and the outer radius $R_e$ about 130 mm. This disc is made of eight segments 3a, 3b, 3c, 3d, 3e, 3f, 3g, 3h, connected through rigid assembly means 4.

These rigid assembly mean are made according to the embodiment illustrated by FIG. 5, that is to say consists of weld pieces 6. The height $h$ of these pieces 6 is equal to 40 mm. so that they extend from the inner circumference to the outer circumference of the disc. As for the circumferential width of these junction pieces 6 it is equal to about 8 mm.

The material of which segments 3a, 3b, etc. are made is 15 CDV 6 steel whereas the junction pieces 6 are made of a Hastelloy X weld.

Finally the disc is provided on its outer periphery with projections 7 intended to fix it in rotation to the part to be braked (wheel of an aircraft in the present case). Such projections, the number of which is advantageously eight, are located in the middle parts of segments 3a, 3b, etc.

In a general manner, while the above description discloses what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is.

1. An annular friction disc which comprises, in combination, at least four circular annular segments of a steel containing from 0.12 to 0.18 percent of carbon, from 1.25 to 1.50 percent of chromium, from 0.8 to 1 percent of molybdenum, from 0.8 to 1.1 percent of manganese and from 0.2 to 0.3 percent of vanadium, said segments having an inner radius of approximately 90 millimeters and an outer radius of approximately 130 millimeters, radial connections between said segments, each of said connections being welded to the adjacent radial sides of the two segments between which it is located, each of said connections extending substantially from the inner circumference of said segments to the outer circumference thereof, said connections having at rest a circumferential dimension of about 8 millimeters, said connections forming welds of a Hastelloy X alloy consisting of from 41.35 to 51.75 percent of nickel, from 17 to 20 percent of iron, from 0.2 to 1 percent of wolfram, from 8 to 10 percent of molybdenum, from 0.5 to 2.5 percent of cobalt, from 20.5 to 23 percent of chromium, at most 1 percent of silicon, at most 1 percent of manganese and from 0.05 to 0.15 percent of carbon.

2. An annular friction disc which comprises, in combination, at least four circular annular segments of a steel containing from 0.12 to 0.18 percent of carbon, from 1.25 to 1.50 percent of chromium, from 0.8 to 1 percent of molybdenum, from 0.8 to 1.1 percent of manganese and from 0.2 to 0.3 percent of vanadium, radial connections between said segments, each of said connections being welded to the adjacent radial sides of the two segments between which it is located, each of said connections extending substantially from the inner circumference of said segments to the outer circumference thereof, said connections forming welds of a Hastelloy X alloy consisting of from 41.35 to 51.75 percent of nickel, from 17 to 20 percent of iron, from 0.2 to 1 percent of wolfram, from 8 to 10 percent of molybdenum, from 0.5 to 2.5 percent of cobalt, from 20.5 to 23 percent of chromium, at most 1 percent of silicon, at most 1 percent of manganese and from 0.05 to 0.15 percent of carbon.

No references cited.

MILTON BUCHLER, *Primary Examiner.*
ARTHUR L. LA POINT, *Examiner.*
G. E. A. HALVOSA, *Assistant Examiner.*